No. 719,639. PATENTED FEB. 3, 1903.
O. P. BECK.
SKEWER MACHINE.
APPLICATION FILED FEB. 14, 1902.
NO MODEL. 5 SHEETS—SHEET 1.

Fig. I.

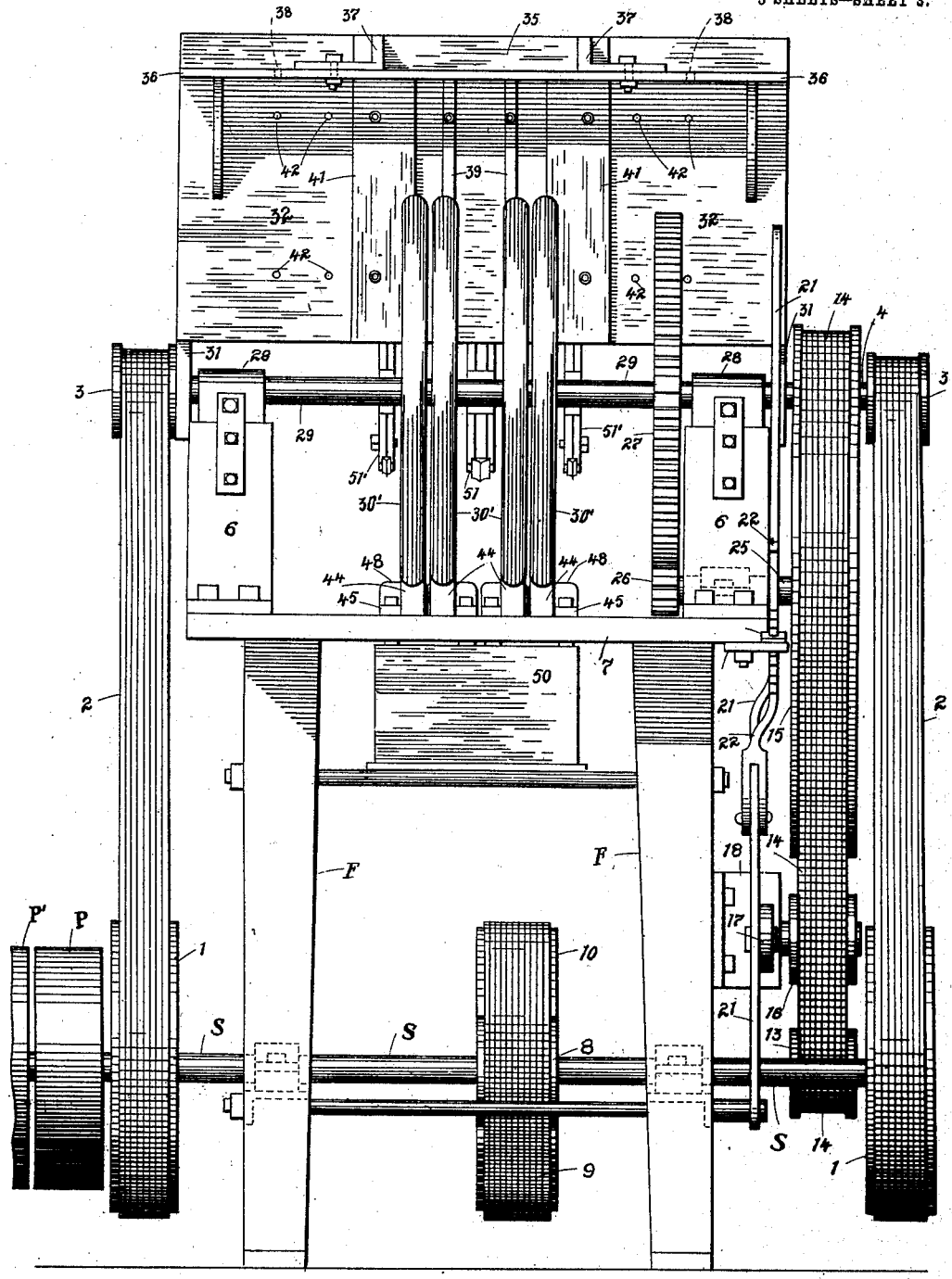

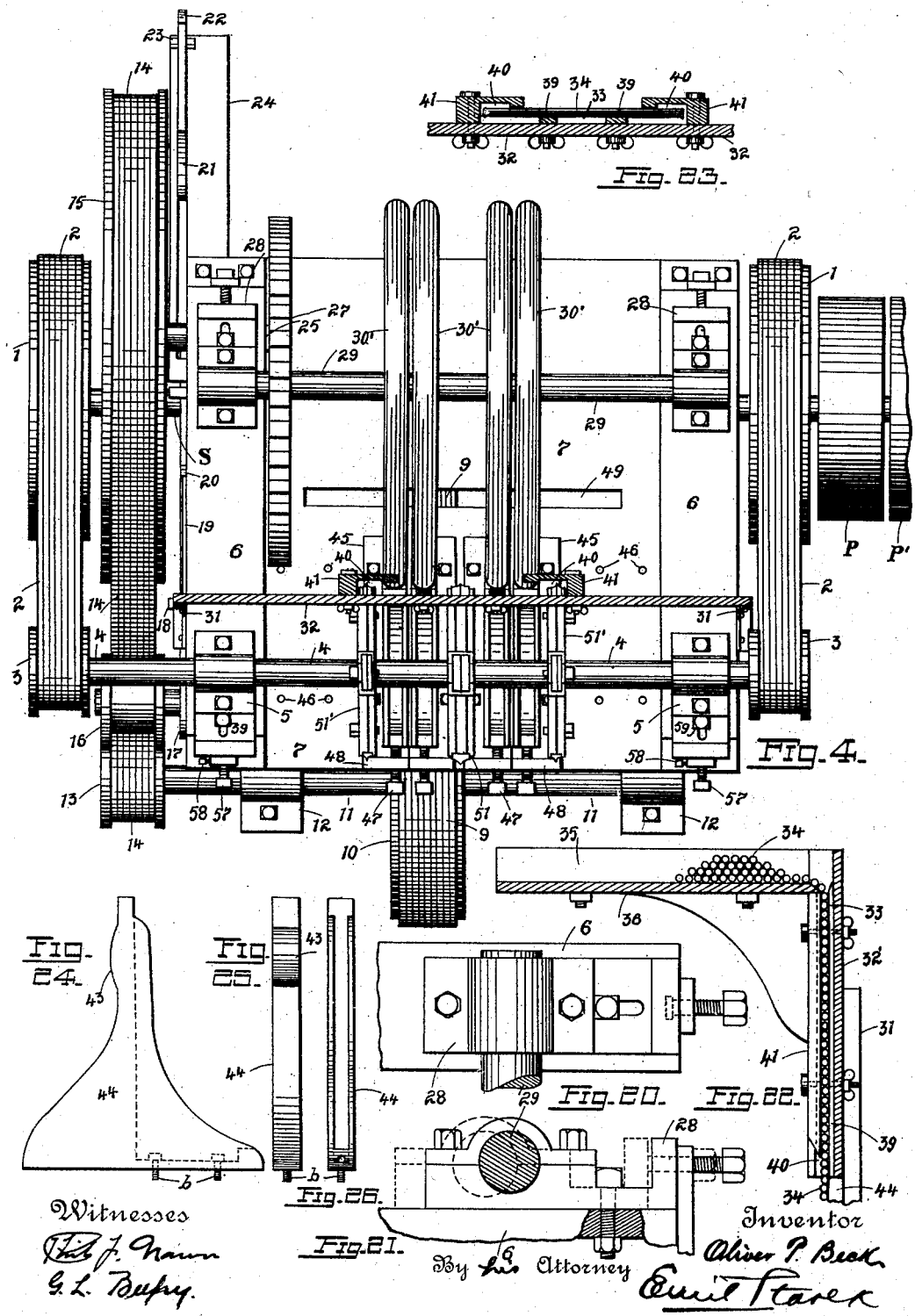

No. 719,639. PATENTED FEB. 3, 1903.
O. P. BECK.
SKEWER MACHINE.
APPLICATION FILED FEB. 14, 1902.
NO MODEL.
5 SHEETS—SHEET 5.
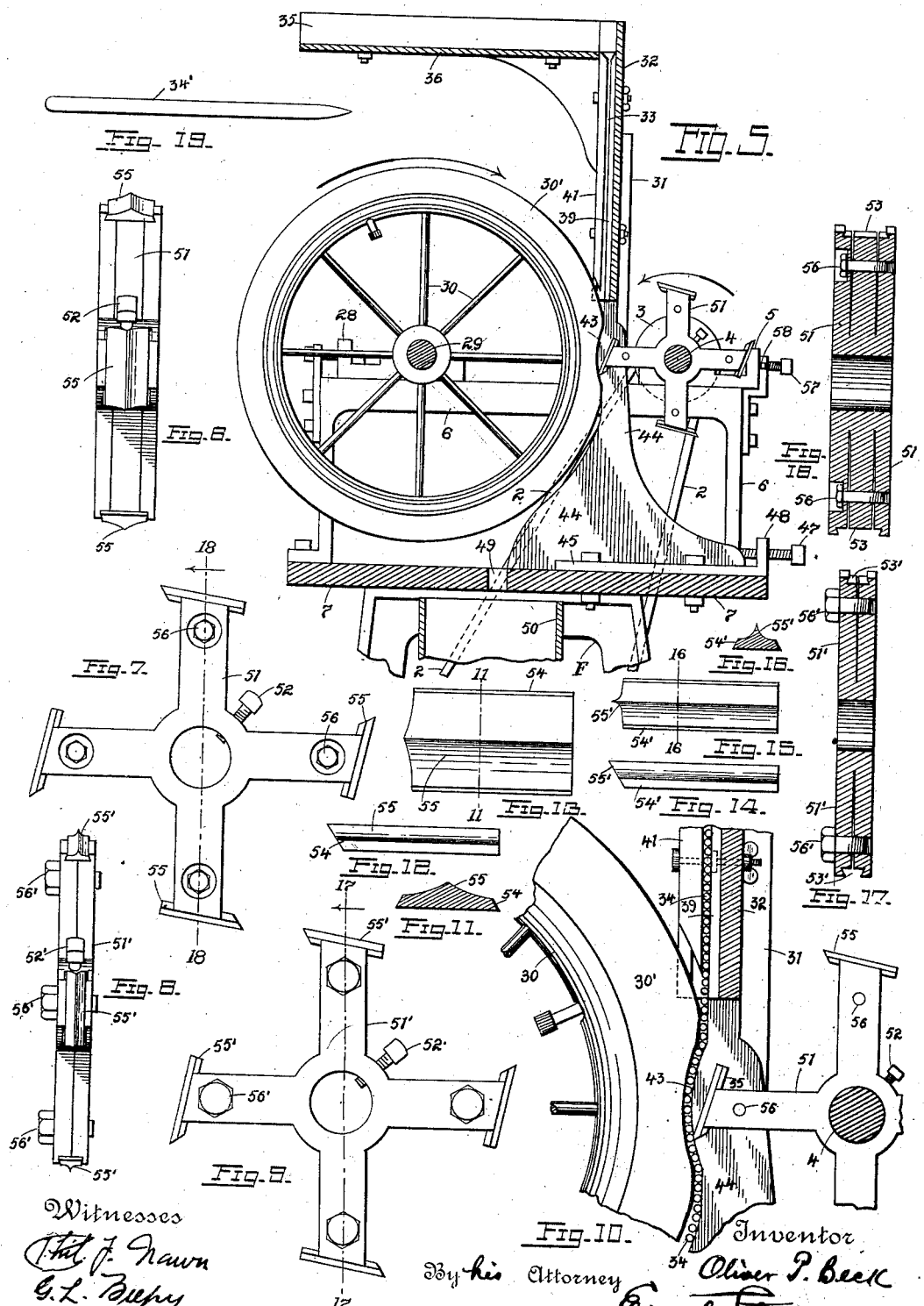
Witnesses
Inventor
Oliver P. Beck
By his Attorney

UNITED STATES PATENT OFFICE.

OLIVER P. BECK, OF MURPHYSBORO, ILLINOIS, ASSIGNOR TO WOLF, SAYER AND HELLER, OF CHICAGO, ILLINOIS, A FIRM.

SKEWER-MACHINE.

SPECIFICATION forming part of Letters Patent No. 719,639, dated February 3, 1903.

Application filed February 14, 1902. Serial No. 94,072. (No model.)

*To all whom it may concern:*

Figure 1:
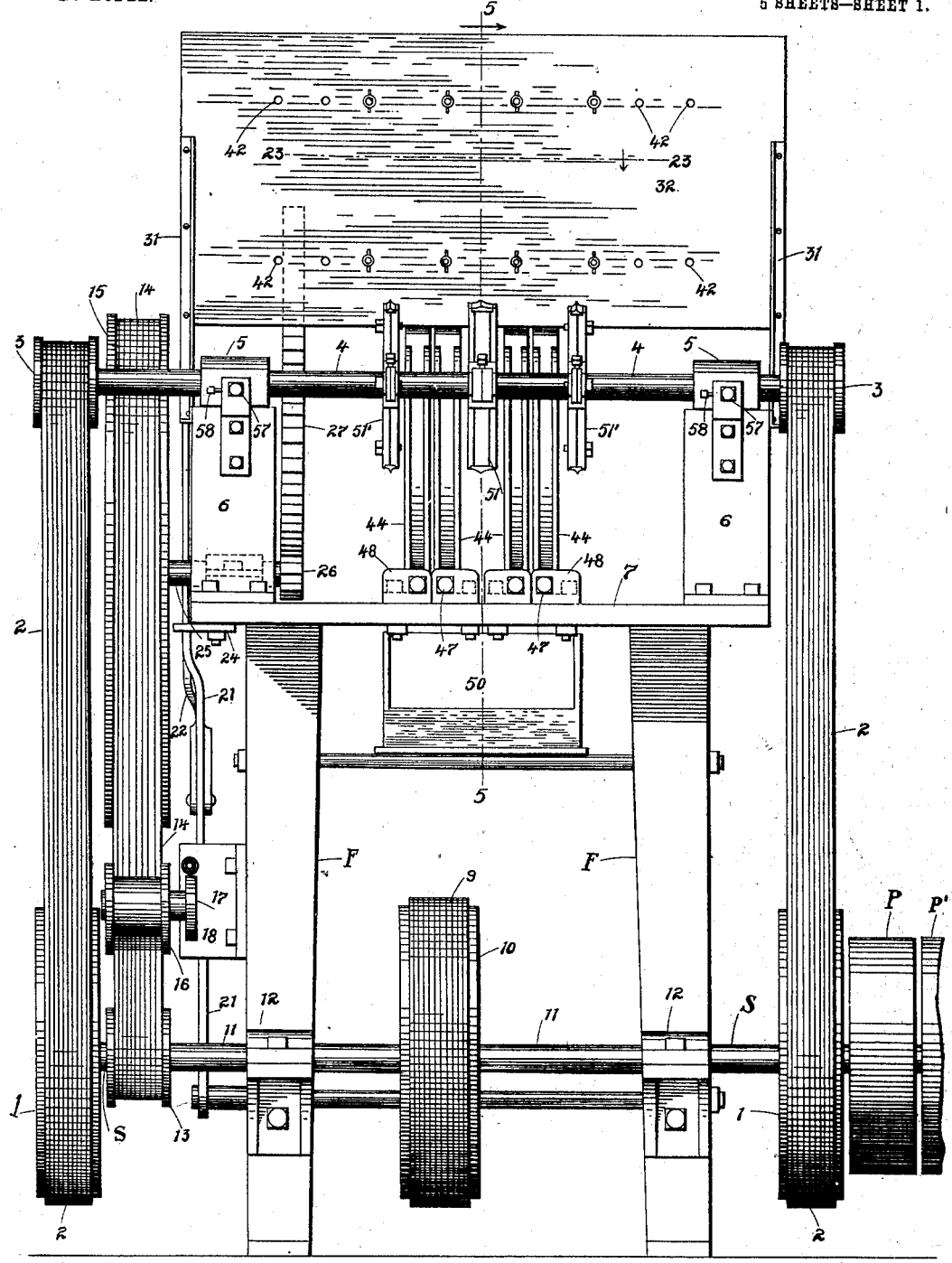
Figure 2:
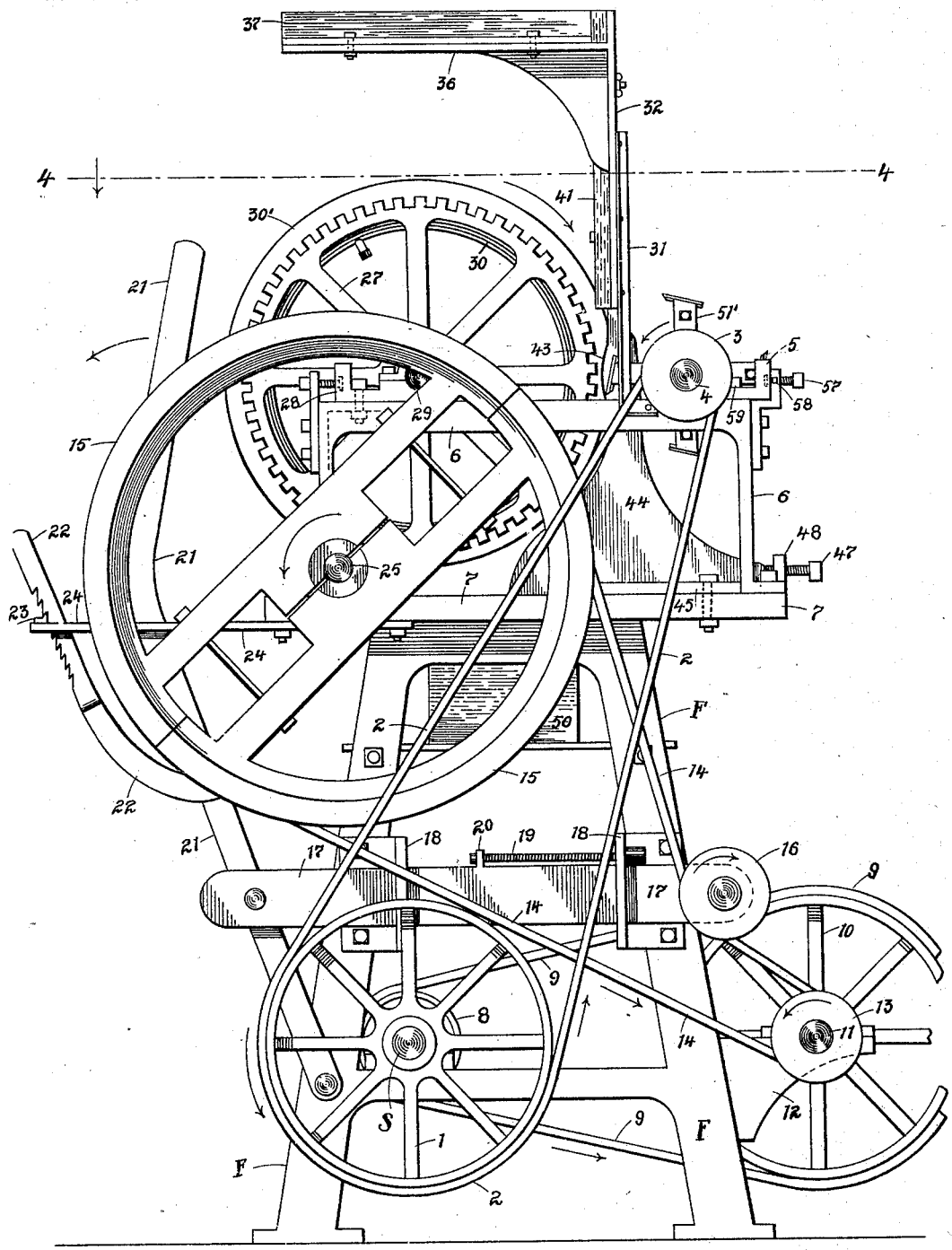

Be it known that I, OLIVER P. BECK, a citizen of the United States, residing at Murphysboro, in the county of Jackson and State of Illinois, have invented certain new and useful Improvements in Skewer-Machines, of which the following is a full, clear, and exact description, reference being had to the accompanying drawings, forming a part hereof.
My invention has relation to improvements in skewer-machines; and it consists in the novel construction and arrangement of parts more fully set forth in the specification and pointed out in the claims.
In the drawings, Figure 1 is a front elevation of the machine. Fig. 2 is a side elevation thereof. Fig. 3 is a rear elevation. Fig. 4 is a horizontal sectional plan, the section being on line 4 4 of Fig. 2. Fig. 5 is a vertical sectional detail on line 5 5 of Fig. 1, parts being shown in elevation. Fig. 6 is an edge view of the main cutter-head and knives carried thereby. Fig. 7 is a side elevation thereof. Fig. 8 is an edge view of the outer cutter-head and knives carried thereby. Fig. 9 is a side elevation thereof. Fig. 10 is an enlarged detail corresponding in a measure to Fig. 5 and showing the stock as it descends through the chute and is fed to the knives or cutters. Fig. 11 is a transverse section on line 11 11 of Fig. 13. Fig. 12 is a side view of the main cutter or knife. Fig. 13 is a top plan thereof. Fig. 14 is a side view of the outer knife or cutter. Fig. 15 is a top plan thereof. Fig. 16 is a cross-section on line 16 16 of Fig. 15. Fig. 17 is a transverse section on line 17 17 of Fig. 9, showing the split construction of the arms of the outer cutter-heads; Fig. 18 is a similar section on line 18 18 of Fig. 7, showing the split construction of the arms of the central cutter-head. Fig. 19 is a plan view of one of the completed skewers. Fig. 20 is a detail plan of a constructional sliding bearing-block for the feed-shaft. Fig. 21 is a side elevation thereof. Fig. 22 is a vertical sectional detail corresponding to parts shown in Fig. 5, illustrating the manner of feeding the stock to the knives. Fig. 23 is a cross-sectional detail of the feed-chute, the section corresponding to the sectional illustration of Fig. 4. Fig. 24 is a side elevation of one of the abutments or standards which coöperates with the feed-disks. Fig. 25 is a rear edge view thereof,
and Fig. 26 is a front edge view of the same.

The object of my invention is to construct a skewer-machine which will insure a positive feed for the stock operated on irrespective of any inequalities inherent in the latter, one which presents ready facilities for the adjustment of the cutter-heads and cutters carried by them, one insuring a positive and uniform grip on the stock during the cutting and pointing operation and insuring a grip on the stock at the moment of the initial application of the cutters, one insuring economy, reliability, and uniform results, and one possessing further and other advantages, better apparent from a detailed description of the invention, which is as follows:

Referring to the drawings, F represents the machine-frame, of any approved design, the same carrying at the bottom thereof the main drive-shaft S, having tight and loose pulleys P P', respectively, and driven from any suitable source of power. (Not shown.) Disposed on the shaft S, exterior to the frame F, are belt-pulleys 1 1, from which passes a belt 2 to the smaller grooved pulleys 3 3 at opposite ends of the cutter-shaft 4, the latter being supported in adjustable bearing-blocks 5, mounted on top of the brackets 6, secured to the bed-plate 7 of the frame. Disposed also on the shaft S within the frame is a belt-pulley 8, from which leads forward a belt 9 over a larger pulley 10, mounted centrally on a parallel shaft 11, supported in brackets 12. One end of the shaft 11 carries a grooved pulley 13, from which passes a belt 14 over a large belt-pulley 15, mounted over the bed-plate, one lap of the belt 14 being tightened by an idler 16, carried at the forward end of a reciprocating belt-tightening bar 17, which is itself supported in brackets 18, carried by the frame F. The idler is normally retracted from the belt by a spring 19, having one end secured to the front bracket 18 and the opposite end to a lug 20, formed on the bar. The rear end of the bar 20 is pivotally coupled to a lever 21, whose lower end is pivoted to the frame F, the lever being provided with a hinged or pivoted pawl or toothed bar 22, adapted to engage a catch 23, carried at the free end of an arm 24, secured to the bed-plate. To tighten the belt 14, the lever 21 is swung in the direction shown by the arrow in Fig. 2, when the pawl 22 will automatically engage the catch 23. To loosen the belt, the pawl is first disengaged from the catch, when the spring 19 will automatically assist in the retraction of the bar 17 and the idler-pulley 16 carried by it from said belt.

The shaft 25 of the pulley 15 carries a pinion 26, which meshes with a large gear-wheel 27, supported in adjustable bearing-blocks 28 on top of the brackets 6, said gear-wheel being mounted on the feed-shaft 29, by which the stock-feeding disks or wheels 30 are supported. The latter are provided with pneumatic tires 30' for a purpose presently better apparent. The arrows in Figs. 2 and 5 show the relative directions in which the several shafts and their wheels revolve.

Supported by angle-pieces 31, (projecting from the top of the brackets 6,) directly in front of the feed-disks 30, is a board or plate 32, which forms the front wall of a chute 33, through which the stock 34 is fed, the latter being conducted into said chute from an open trough 35, having the bracket 36 for its bottom and the angle-bars 37 for its side walls, the latter being secured adjustably to said bracket by bolts passing through properly-spaced openings 38, formed for their reception. In the descent of the stock through the chute 33, the individual sticks or stock from which the skewers are cut are guided on either side of their center by the parallel bearing or guide strips 39 secured to the rear surface of the wall 32, the ends of the sticks being loosely confined during such descent, in the channels 40 formed by the exterior angle-bars 41. As best seen in Figs. 1 and 3, the guide-strips 39 and angle-bars 41 are connected to the wall 32 by bolts passed through openings 42, spaced at predetermined distances apart horizontally. This is for the purpose of adjusting the width of the chute 33 for different lengths of stock, the parts being by this arrangement readily detached and subsequently fastened to the wall 32. The stock as it emerges from the chute 33 is immediately gripped between the pneumatic tires of the feed-disks and the curved segments 43, formed as a part of a series of ribbed standards or abutments 44, disposed on top of the bed-plate opposite each feed-disk and secured thereto by bolts b, Fig. 24, the standards being protected against lateral displacement by the guard-rails 45, bolted along the bed-plate, the latter being provided with a series of openings 46 to allow for the spacing of the guard-rails and the standards to correspond to any change in the spacing of the feed-disks along their supporting-shaft, it being understood that for long skewers the spacing between the feed-disks is increased in proportion to the increase in the horizontal spaces between the strips 39 and bars 41.

Each standard is reinforced against the strain imparted to it by the feed-disk by a tightening-bolt 47, carried by the forward upturned wall or lip 48 of the guard-rail. The proximity of each feed-disk to its abutment 44 is such that the pneumatic tire becomes compressed against the abutment for a suitable distance below and above the segment, the curvature of which intersects the outer circle of the feed-disk, Figs. 2, 5, 10, insuring thereby a gradual grip on the stock the moment it emerges from the chute 33 and just as it leaves the strips 39 and a corresponding release of the stock after the same has been cut, the skewers then rolling along the rear curved edges of the standards through an opening 49 in the bed-plate into a receptacle 50, located beneath said opening. The object of effecting a positive contact between the tire and abutment on either side of the segment 43 is for the purpose of insuring a parallelism for the delivery of the cut skewers with the movement of the original stock, the latter, as well as the cut skewers, traveling as a continuous web through the machine. The stock begins to be cut the moment a sufficient grip is insured therefor between the feed-disks and the standards 44, the maximum cut being imparted thereto, of course, as the same is passing over the segments 43, the stock having imparted thereto a slightly more than one complete rotation about its axis in its advance from the point of its first seizure by the feed-disks to the point of release. The stock is cut at three different points—at the center and at each end—the center cut resulting in the formation of two pointed skewers and the end cuts serving to impart a rounded finish to the blunt ends of the skewers. The cutter-heads 51 51', carrying the knives by which the cutting is effected, are mounted, of course, on the cutter-shaft 4 and (to conform to any adjustment of the feed-disks and their standards) are adjustable along said shaft, the bolts 52 52' securing them in place when once adjusted. The arms of the head 51 are split twice in planes parallel to the plane of rotation of the head, the split segments having formed at their free ends a groove 53, inclined to the tangent of the circle of rotation of the arms, said groove receiving the tongue 54 of the central knife 55, and when once adjusted the split segments are drawn together by countersunk tightening-bolts 56, thus holding the knife in place. The arms of the exterior heads 51' are split once in a similar way, the terminal inclined grooves 53' thereof receiving the tongue 54' of the outer knife 55'. The inner cutter-head occupies a position in a plane between the inner standards and between the strips 39, the outer heads 51' occupying planes exterior to the outer standards, but within the limits of the channels formed by the angle-bars 41. (See Fig. 1.)

In the operation of the machine the chute 33 is first filled with the original stock, the pieces being dropped in horizontal layers. Then as the machine is set in operation the feeding and cutting progress simultaneously, as is obvious from the foregoing description. When once the machine is started, the chute 33 is kept filled by shoving a stick at a time into the upper open end thereof from the trough 35.

It was stated above that the shaft 4 was mounted in adjustable bearing-blocks 5. These are of the ordinary construction, being manipulated backward and forward by the adjusting-bolts 57, locked by the locking-bolts 58, the blocks when once adjusted in their ways or bearings being firmly secured by the bolts 59. These features of construction are well known and no claim is made thereto. The object of the adjustment, however, is to take up the wear of the knives, an adjustment which can be made with the greatest nicety and precision.

By the use of a pneumatic tire on the feed disks or wheels not only is a sensitive and positive contact with the stock insured, but also a positive and uniform feed at all times, the compression of the tire conforming readily to any irregularities of cross-section in the individual sticks from which the skewers are cut.

Of course it is to be understood that I do not limit the application of the present machine to the cutting of skewers, as the same may be employed with equal advantage for the manufacture of kindred products. Neither do I wish to be limited to the several details here set forth, as these may in a measure be departed from without in any way affecting the nature or spirit of my invention.

The skewer 34' when completed is shown in Fig. 19.

Having described my invention, what I claim is—

1. In a skewer-machine, a feeding-couple comprising a rotatable disk having a yielding tire, and a rigid abutment having a curved segment whose arc intersects the arc of the outer circle of the tire, the latter being adapted to contact against the segment, and simultaneously on either side thereof, for purposes of insuring parallelism of travel between the original stock and the cut skewers, substantially as set forth.

2. In a skewer-machine, a feeding-couple comprising a rotatable disk having a yielding tire, and an adjustable rigid abutment having a curved segment intersecting the outer circle of the tire, the latter being adapted to contact against the segment and against the abutment at suitable distances above and below the segment, substantially as set forth.

3. In a skewer-machine, a chute, a series of peripherally-yielding feed-disks and coöperative abutments having curved segments intersecting the outer circles of said disks, adapted to grip the stock as it emerges from the chute, the disks contacting with the abutments above and below the segments, a cutter-shaft located opposite the medial point of the arc of the segment and disposed parallel to the axis of the feed-disks and adjustable to and from said axis, cutter-heads mounted on said cutter-shaft, and a series of knives carried by said cutter-heads, substantially as set forth.

In testimony whereof I affix my signature in presence of two witnesses.

OLIVER P. BECK.

Witnesses:
   EMIL STAREK,
   G. L. BELFRY.